Aug. 17, 1965  R. S. ZEBARTH ETAL  3,200,562
APPARATUS FOR ARTICLE PACKAGING
Original Filed April 6, 1959  4 Sheets-Sheet 1

United States Patent Office 3,200,562
Patented Aug. 17, 1965

3,200,562
APPARATUS FOR ARTICLE PACKAGING
Ralph S. Zebarth, Kansas City, Richard L. Lewis, Independence, and Drexel T. Carlson, Kansas City, Mo., assignors to Gordon Johnson Company, Kansas City, Mo., a corporation of Missouri
Original application Apr. 6, 1959, Ser. No. 804,481, now Patent No. 3,071,906, dated Jan. 8, 1963. Divided and this application Aug. 24, 1962, Ser. No. 219,166
14 Claims. (Cl. 53—184)

This is a division of my copending application, Serial No. 804,481, filed April 6, 1959, and entitled "Method for Article Packaging," now Patent No. 3,071,906, issued January 8, 1963.

This invention relates to novel apparatus for packaging articles of merchandise such as poultry.

It has been found advantageous in recent years to package consumer products in films of synthetic resin materials, not only because of the inexpensive nature of the packaging procedure but also because the final package is more attractive than heretofore provided units and the customer may view the product through the normally transparent film. However, serious problems have been encountered in the provision of packages which are sealed from the ambient atmosphere and which are capable of adequately protecting the product contained therein during subsequent handling and sale of the packaged product. The problem has been especially acute in the poultry processing industry wherein it is desirable that fowl such as chickens be packaged in an attractive container which permits the customer to view the product, yet is of sufficient inherent strength to protect the product, notwithstanding the fact that the same may be relatively easily bruised or punctured during handling thereof, and which also retains fluid integrity against entrance of air into the container or body fluids and water out of the container.

Another difficulty which has arisen is the tendency of frost to form on the outer surface of the poultry during freezing of the same subsequent to processing and which occurs unless the film presenting the container substantially firmly engages the entire exposed surface of the bird or the like. Although the relatively flexible and pliable films conventionally available do engage sufficient areas of the poultry to prevent the frosting set forth above, these films are unsatisfactory from the standpoint of being relatively easily broken or torn, as well as punctured during subsequent handling of the product and, therefore, air is permitted to enter the container, and body fluids may readily leak from the container upon thawing of the product.

In other instances, the poultry is not frozen prior to distribution and in this situation the flexible and pliable films referred to above are likewise not of utility because of the ease in which the same may be ruptured and thereby causing the deleterious results referred to above.

Prior attempts have been made to seal poultry products and the like within synthetic resin films of relatively rigid characteristics, but these efforts have not met with success primarily because of the fact that the parts of the container did not firmly engage substantially the entire outer surface of the birds and furthermore, it was virtually impossible to adequately seal the container so that the same did not leak during later handling and sale of the packages.

Another factor contributing to leakage of the prior sealed packages utilizing either flexible and pliable films or the more rigid materials, was the problem of folds and irregularities in the film resulting from the latter being folded about the product and then suitably sealed either in conjunction with a laminated backing board or simply heat-sealed against one surface of the product.

It is, therefore, the most important object of the present invention to provide an improved apparatus for permitting packaging of products such as poultry in a manner so that the birds are protected during handling and sale thereof and with the packages presenting an attractive appearance, whether the products are merely chilled or frozen before marketing display therof.

A further important object of the invention includes the provision of improved apparatus for sealing articles in the nature of poultry products within a container which is resistant to admittance of air thereinto or leakage of fluids from within the container, despite relatively rough handling of the package.

A still further important object of the invention is to provide apparatus for packaging poultry products adapted for being employed to package all varieties of poultry and which is especially useful for chickens, with the container components of standard size and yet designed to package birds of different weight without modification of the packaging apparatus, the method of operating the same or the parts of the container itself.

An important aim of the invention is to provide apparatus for packaging poultry products wherein containers of standard size may be employed for chickens of different weights by virtue of the lid of the container being telescoped over the tray portion thereof to an extent dependent upon the size of the bird, and with the material from which the container is formed being characterized by the property of shrinking under the influence of heat whereby extraneous flange portions of the container components which would normally remain after placement of the poultry within such container may be avoided by the simple expedient of subjecting such extraneous flange portions to sufficient heat to shrink the same and at the same time melt the synthetic resin material and produce a fluid-tight seal as opposed, melted areas of the container components flow together.

An additional important object of the invention is to provide apparatus for packaging poultry products in a container of the defined character which is substantially automatic in operation and requiring very little physical effort other than placement of the package to be sealed within the machine, and followed by actuation of suitable switch mechanism. As a result, the packaging operation is efficient and effective at a minimum unit cost.

It is also an important object of the invention to provide improved apparatus for sealing opposed components of the package container having mechanism for causing the thermoplastic, heat-shrinkable, synthetic resin material from which the container is constructed to be subjected to a preheating phase sufficient to soften the material without causing substantial shrinking or melting of the latter, whereupon movement of the areas of the container to be sealed into engagement with a heating element produces a more effective and fluid-tight seal by virtue of the initial softening of the thermoplastic material.

Figures 5, 6, 8:
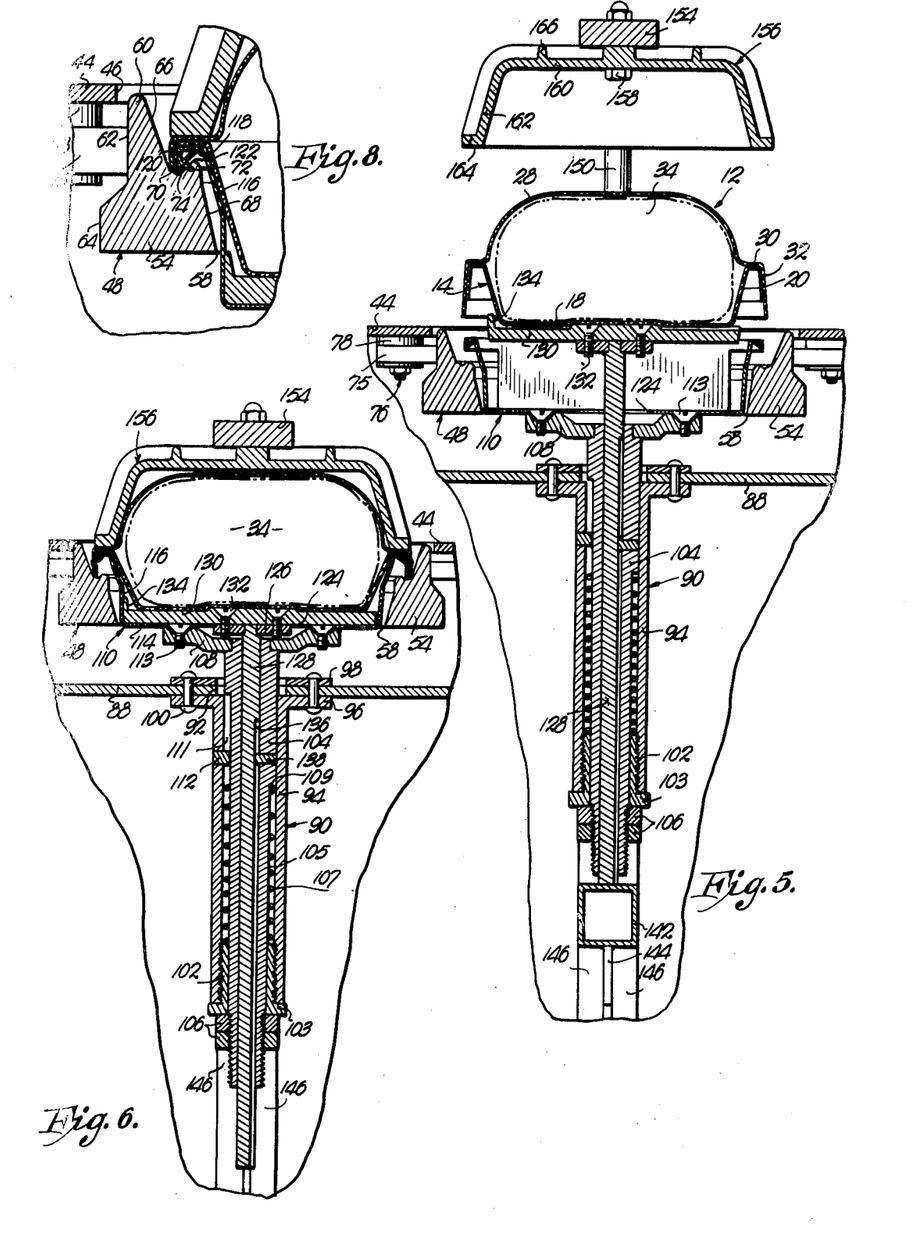
FIG. 5 is a fragmentary, enlarged, vertical, cross- sectional view taken on line 5—5 of FIG. 3, looking in the direction of the arrows, and illustrating the ram structure at the uppermost end of the normal path of travel thereof.
FIG. 6 is a fragmentary, enlarged, cross-sectional view similar to FIG. 5 but showing the ram structure intermediate the ends of the path of travel thereof and substantially at a preheat position.
FIG. 8 is a fragmentary, enlarged, vertical, cross-sectional view on the same line as FIG. 7 but illustrating in greater detail, the transverse, cross-sectional configuration of the heating element and associated components for heat-sealing the article package.
Figure 9:
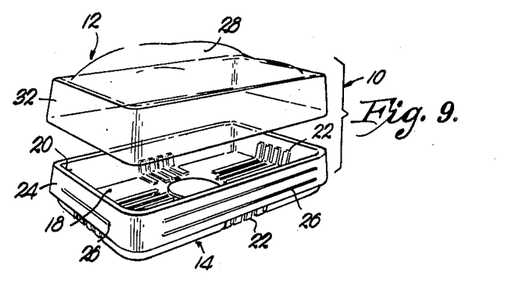
FIG. 9 is a reduced, exploded perspective view of the two components of the article container and indicating how the same may be moved into telescoped relationship to enclose the article to be packaged.

A novel container particularly adapted to be employed with the present apparatus in the packaging of products such as dressed poultry and especially chickens, is broadly numerated 10 in the drawings and preferably comprises a pair of preformed members 12 and 14 adapted to be moved into telescoped relationship as shown in FIG. 5, in order to enclose the product to be packaged. Members 12 and 14, which are in the nature of a lid and tray respectively, are of a thermo-plastic, heat-shrinkable, synthetic resin material of sufficient thickness and characterized by the property of presenting a self-sustaining container component upon forming of the initially sheet material into the configuration illustrated in FIG. 9. Tray 14, for example, is of rectangular shape and provided with a bottom 18 integral with an upstanding side wall and thereby presenting a cup-shaped compartment for receiving the article to be packaged, such as a dressed chicken or the like. Although tray 14 is relatively self-sustaining by virtue of the synthetic resin material employed in production of the same, it is to be preferred that a series of radially extending ribs 22 be formed in bottom 18 and side wall 20 to reinforce the same. Downturned flange portion 24 of tray 14, integral with the uppermost margin of side wall 20, serves as the marginal portion of the same which is adapted to be melted to provide a seal between lid 12 and tray 14. An especially important feature of flange 24 is the provision of one or more elongated indentations 26 extending longitudinally of respective rectilinear stretches of flange 24 and thereby minimizing the tendency of such straight stretches of flange 24 to bow longitudinally thereof. Also, it is to be preferred that side wall 20 of tray 14 flare outwardly, as best shown in FIG. 5, while flange 24 also flares outwardly from side wall 20 to present a substantially trapezoidal space between opposed surfaces of side wall 20 and flange 24. In this way, a plurality of trays 24 may be disposed in stacked, telescoped relationship prior to utilization of the same for packaging purposes and thereby maintaining the storage space for trays 14 at a minimum prior to utilization of the same.

Lid 12 is also preformed of a thermoplastic, heat-shrinkable, synthetic resin material preferably the same as that from which tray 14 is formed. The central, substantially rectangular area 28 of lid 12 is formed to substantially conform to the normal upper surface configuration of a dressed chicken and therefore, has a pair of raised areas at one end thereof presented by a depression between the same and thereby conforming to the breast of the bird, while the remaining surface of area 28 slopes downwardly and includes spaced, raised areas at the end thereof which is adapted to conform to the thighs and upper legs of the bird. Since lid 12 is relatively self-sustaining, it can be recognized that when area 28 is preformed to the configuration of the upper surface of the bird, the inner face of area 28 substantially conforms to the bird and moves into tight engagement therewith during the packaging operation to be described in greater detail hereinafter.

Lid 12 has a laterally extending, peripheral section 30 integral with the margin of area 28, as well as a downturned, outer peripheral skirt portion 32 which is flared outwardly and of sufficient size to complementally receive flange 24 of a tray 14. Again, it is to be noted that the outwardly flared disposition of skirt portion 32 facilitates stacking of lids 12 in telescoped relationship prior to utilization of the same.

Although tray 14 and lid 12 may be constructed of various types of thermoplastic, heat-shrinkable, synthetic resin materials, best results have been obtained by utilizing orientated polystyrene of sufficient thickness to render tray 14 and lid 12 of self-sustaining characteristics, yet retaining flexibility and resiliency so that the same returns to its preformed shape upon deformation thereof in the absence of heat.

It is also contemplated that the material from which tray 14 is constructed be opaque in character, while lid 12 is transparent to permit the customer to view the product through area 28 of lid 12. For the marketing of poultry products such as dressed chickens, the attractiveness of the package is materially increased by utilizing a yellow pigment in the material from which tray 14 is formed.

In the packaging of a product such as a dressed chicken 34, the latter is placed within a tray 14 with the breast thereof facing upwardly, and then one of the lids 12 is placed over the bird 34 in a manner so that area 28 complementally engages the upper surface configuration of the poultry product. With the inner face of area 28 engaging the bird, it can be seen that skirt portion 32 is disposed in telescoping relationship with respect to flange 24, and the defined marginal portions are in overlapping, abutting relationship, as best shown in FIG. 5. It is of importance to note that skirt portion 32 is of greater width than flange 24 to thereby impart maximum utility to container 10 and permit the same to be utilized to package chickens or the like of different weights and employing lids 12 and trays 14 of a standard size. Tray 14 and lid 12, as illustrated and described, have been found to be capable of being utilized to package chickens ranging from one and three-quarters to over three pounds without modification of the container components in any way. It can be recognized however, that different size trays 14 and lids 12 may be provided for larger birds such as ducks, geese and turkeys and also for other meat or food products.

Container 10, having the dressed chicken 34 therein, is now in condition for sealing with apparatus 16. Various heat-sealing machines may be employed to effect a proper seal between skirt portion 32 and flange 24 of lid 12 and tray 14 respectively, but apparatus 16 as illustrated in the drawings has been found to be of especial utility in providing the necessary fluid-tight seal at a minimum cost and without deleteriously affecting the appearance of the final sealed package.

Apparatus 16 includes a hollow housing 36 provided with a pair of opposed side walls 38 and 40 interconnected by respective opposed end walls 42 and 43. Top wall 44, carried by the upper margins of respective side walls 38 and 40 and end walls 42 and 43, has a pair of spaced, longitudinally aligned, rectangular openings 46 therein clearing the uppermost edges of corresponding heating elements 48. Parallel, horizontally spaced channels 50 spanning the distance between opposed side walls 38 and 40 adjacent the lower margins thereof, each carry a pair of telescopic legs 52 depending therefrom and serving to support housing 36 in predetermined, spaced relationship relative to the floor or the like. Since legs 52 are extensible in character, the longitudinal lengths thereof may be suitably adjusted to assure disposition of housing 36 in a substantially horizontal position.

Figure 2:
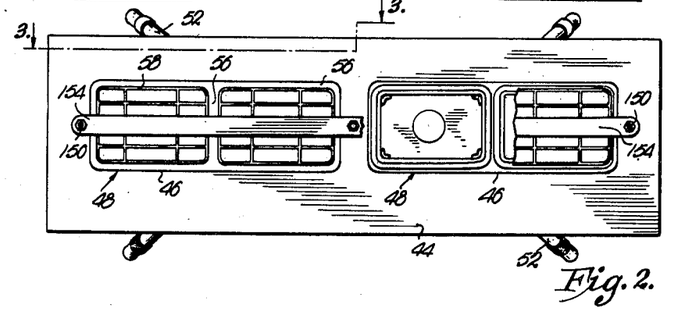
FIG. 2 is a plan view of the apparatus shown in FIG. 1 with certain portions of the ram mechanism thereof being broken away to reveal details of the container-receiving shiftable platen carried by the main housing of the apparatus.

Heating elements 48 each include a main body portion 54 of substantially rectangular configuration with the longest stretches thereof interconnected by a cross section 56, whereby a pair of rectangular openings 58 are presented in each of the heating elements 48 with openings 58 being aligned longitudinally of top wall 44 as best shown in FIG. 2.

Each of the body portions 54 and cross sections 56 of respective heating elements 48 is of predetermined cross-sectional configuration and includes an upwardly extending, transversely triangular segment 60 integral with main body portion 54. The outer face 62 of segment 60 is substantially vertical and spaced inwardly from the outer vertical face 64 of main body portion 54. The innermost surface 66 of segment 60 is disposed at an angle with respect to face 62, with the diameter of the opening defined by surface 66 decreasing as main body portion 54 of each of the heating elements 48 is approached. The inner surface 68 of main body portion 54 opposed to outer surface 64 thereof is disposed at an angle substantially complemental with that of side wall 20 of a tray 14 to thereby provide clearance for tray 14 during the sealing operation. Angularly disposed surfaces 70 and 72 of main body portion 54 between a respective segment 60 and surface 68 thereof, present a substantially V-shaped groove 74 adapted to receive the edges of skirt portion 32 of lid 12 and flange 24 of tray 14. Surface 70 is at an angle of approximately 30° with respect to the horizontal, while surface 72 is approximately 45° relative to the horizontal, with these angles being important to assure proper sealing of container 10. It is to be understood that grooves 74 extend around each of the openings 58 of heating elements 48 and are thus formed in main body portions 54 and corresponding cross sections 56.

Figures 4, 7, 11, 12:
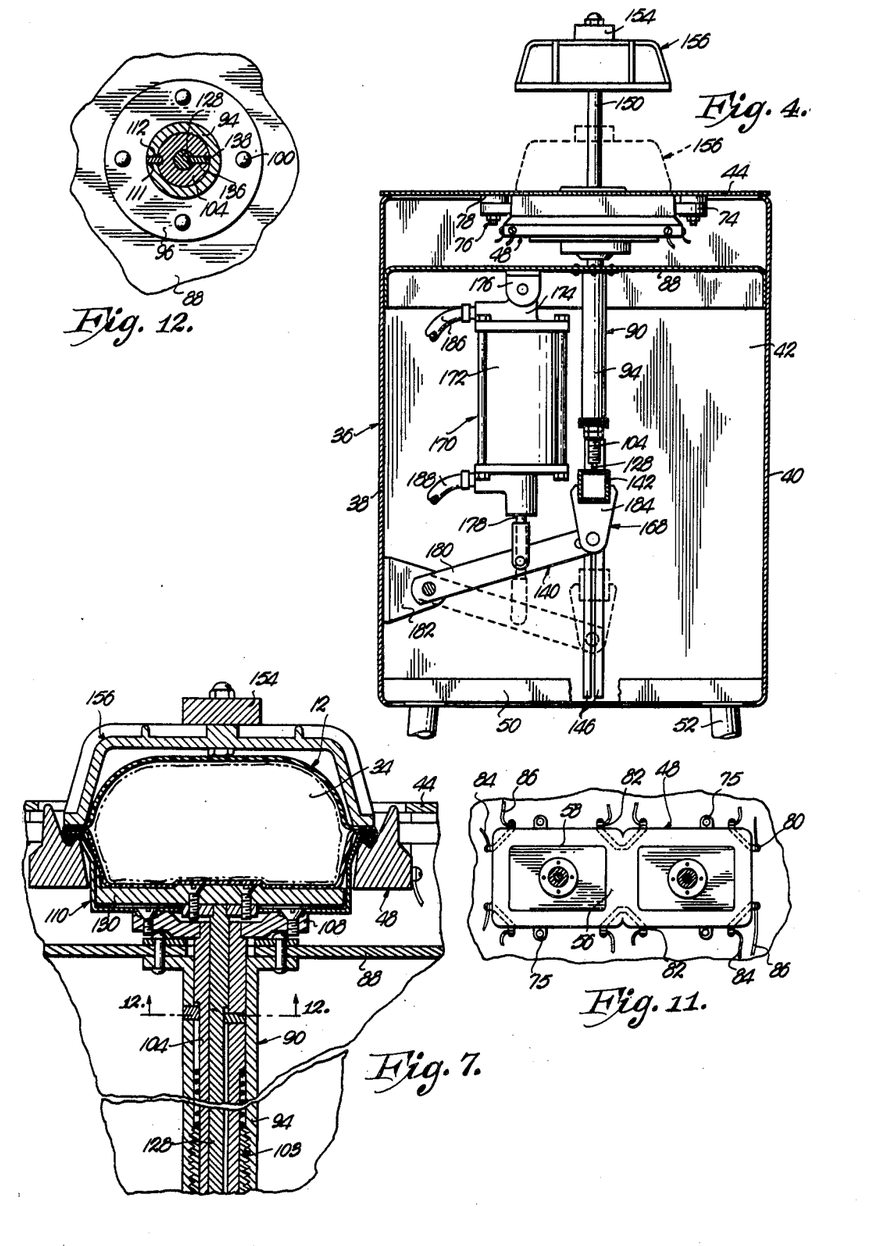
FIG. 4 is a fragmentary, enlarged, vertical, cross-sectional view taken on line 4—4 of FIG. 1.
FIG. 7 is a fragmentary, enlarged, vertical, cross-sectional view on the same line as FIGS. 5 and 6 and illustrating the ram structure at the lowermost end of the path of travel thereof.
FIG. 11 is a fragmentary, plan view of one of the heating elements associated with the ram structure and the electrical resistance units for raising the temperature of the element being shown in dotted lines.
FIG. 12 is a fragmentary, enlarged, horizontal, cross-sectional view substantially on line 12—12 of FIG. 7 and looking in the direction of the arrows.

It is contemplated that heating elements 48 be constructed by casting procedures and therefore, it is preferred that integral mounting bosses 75 be provided around the periphery of main body portions 54. Bosses 75, provided with suitable bolt-receiving apertures therein as shown in FIG. 11, are adapted to be secured to the underside of top wall 44 by suitable bolt and nut means 76 extending through respective bosses 75, as well as spacers 78 between the lower surface of top wall 44 and respective bosses 75. The upper ends of bolt and nut means 76 are secured to or rest on the upper face of top wall 44.

A number of heating units 80 are embedded in each element 48 and preferably of substantially U-shaped configuration and disposed at respective corners thereof, as illustrated in FIG. 11. V-shaped heating units 82, embedded within corresponding heating elements 48 at the zones of juncture of opposed ends of cross sections 56 with main body portions 54, also provide heat at the corners of openings 58 defined by cross sections 56. Although heating units 80 and 82 may be of different types, the preferred units are of high resistance wire having power leads 84 and 86 connected to opposed ends thereof and suitably coupled with an electrical power system. A thermostat or thermocouple is also either secured to the outer surface of each of the heating elements 48 or embedded therein and operably coupled with leads 84 and 86 to control the flow of electrical current to units 80 and 82, and thereby maintain corresponding heating elements 48 at a predetermined, selectively variable temperature.

A generally horizontal inner wall 88 is provided within housing 36 and welded or otherwise secured to the inner surfaces of side walls 38 and 40, as well as end walls 42 and 43 in relatively close relationship to the underface of top wall 44. Wall 88 serves as means for mounting container-supporting structure 90 provided for each of the openings 58 in heating elements 48. Since structures 90 are identical in construction, only one of the same is illustrated in detail in FIGS. 5 to 7 inclusive and the description will be limited to the structure shown.

Structure 90, as shown in FIGS. 5 to 7 inclusive, is carried by inner horizontal wall 88 and includes a cylinder 94 disposed in concentric relationship to an opening 92 through wall 88 and in direct alignment with a respective opening 58 in a proximal heating element 48. Flange 96 on the uppermost end of cylinder 94 is disposed in abutting relationship to the lower surface of wall 88 and is secured to the latter by a plurality of rivets 100 extending through flange 96 and a washer 98 overlying the upper surface of wall 88 in axial alignment with opening 92.

The lowermost extremity of cylinder 94 is internally threaded and complementally receives an externally threaded bushing 102 having a flange 103 engaging the lower end of cylinder 94. Sleeve 104, reciprocably carried by cylinder 94, projects outwardly from both ends of the latter and has a pair of lock nuts 106 on the lower extremity thereof for limiting upward movement of sleeve 104 relative to cylinder 94 and thereby wall 88. A central section 105 of sleeve 104 is of lesser diameter than the upper part of the defined sleeve to present a cylindrical area between section 105 and the inner surface of cylinder 94, and which receives a coil spring 107 bearing against the upper edge of bushing 102 and engaging the annular shoulder 109 of sleeve 104 presented by the lower margin of the part of sleeve 104 of a diameter substantially equal to the inner dimension of cylinder 94. Elongated slot 111 in the enlarged part of sleeve 104 above coil spring 107 slidably receives a pin 112 extending through the side wall of cylinder 94, whereby rotation of sleeve 104 about the longitudinal axis thereof is precluded by pin 112.

The upper extremity of sleeve 104 projecting above washer 98, mounts an annular, transversely irregular plate 108 welded to sleeve 104 in concentric relationship thereto and serving as means for mounting a substantially cup-shaped sealing tray member 110 also in coaxial relationship with cylinder 94 and sleeve 104. The tray member 110 is substantially rectangular in configuration and is adapted to complementally receive a tray 14 in telescoped relationship thereto. Bottom 114 of tray member 110 is secured to plate 108 by a series of screws 113 extending through bottom 114 and into plate 108. Rectangular side wall 116 of tray member 110 has a generally upright section integral with the peripheral margin of bottom 114, while the upper sections of wall 116 remote from bottom 114 flares outwardly in a manner complemental with the outer surface of side wall 20 of a tray 14. Ledge portion 118 of tray member 110 integral with the upper peripheral margin of side wall 116 is disposed to receive the section of tray 14 between side wall 20 and flange 24 thereof. V-shaped reinforcing segment 120 integral with the outer margin of ledge portion 118 includes an outer, normally vertical section and an upturned, angularly disposed inner section 122 engaging the underface of ledge portion 118. As best shown in FIG. 8, section 122 is disposed at substantially a 45° angle with respect to the horizontal and complementally engages surface 72 when tray member 110 is at the lower end of its path of travel. Note should also be taken of the fact that the edge defined by the zone of merger of section 122 with the vertical wall of segment 120 is received at the bottom part of groove 74 at the juncture of surfaces 70 and 72.

Bottom 114 of tray member 110 is also provided with an opening 124 therein concentric with plate 108 and clearing an annular element 126 welded to the upper extremity of an elongated rod 128 reciprocably mounted in sleeve 104 for reciprocatory movement relative thereto. A rectangular platen 130 removably secured to element 126 by screws 132 passing through platen 130 and into element 126, is substantially complemental with bottom 114 of tray member 110 and has an upstanding stop 134 on one longitudinal margin thereof for limiting movement of a container 10 in one direction, as will be explained hereinafter.

Rod 128 extends downwardly from the lower extremity of sleeve 104 and is provided with an elongated slot 136 therein slidably receiving a pin 138 carried by and extending through sleeve 104 into slot 136 for preventing rotational movement of rod 128 relative to sleeve 104 and thereby cylinder 94.

Ram mechanism broadly designated 140 and mounted on housing 36 includes a cross member 142 disposed within housing 36 in direct underlying relationship to cylinders 94 and thereby rods 128, with vertical, substantially trapezoidal plates 144 welded to opposed ends of cross member 142 being slidably received between spaced guide elements 146, suitably secured to the innermost faces of respective end walls 42 and 43.

Figure 3:
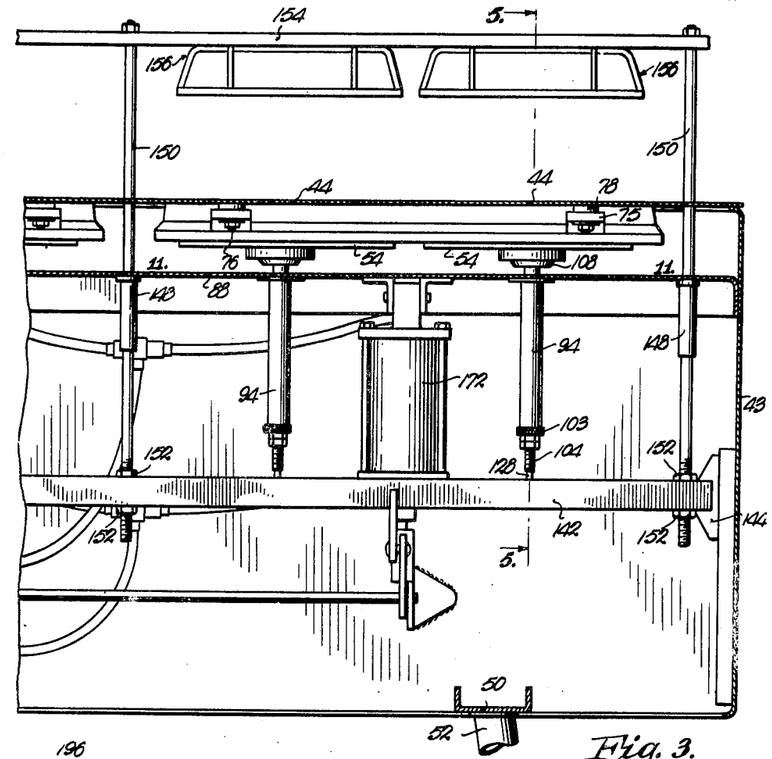
FIG. 3 is a fragmentary, enlarged, vertical, cross-sectional view taken substantinally on the irregular line 3—3 of FIG. 2 and looking in the direction of the arrows.

Three cylinders 148 secured to the underface of inner wall 88 in horizontally spaced, depending relationship thereto slidably receive respective rods 150 projecting upwardly through suitable openings in top wall 44 and adjustably connected at the lowermost ends thereof to cross member 142. As indicated in FIG. 3, the lower, externally threaded extremities of rods 150 pass through suitable openings therefor in cross member 142, with lock nuts 152 on opposed sides of cross member 142 serving to maintain respective rods 150 in predetermined relationship relative to cross member 142. A crossbar 154 removably carried by rods 150 at the upper extremities thereof and in parallel relationship to cross member 142, carries a ram head broadly numerated 156 for each of the openings 58 in heating elements 48.

Each of the ram heads 156 is substantially cup-shaped and secured to crossbar 154 by a bolt 158 extending upwardly through the bottom wall 160 of a respective head 156 and into a proximal portion of crossbar 154. The side wall 162 of each of the ram heads 156 is of rectangular configuration flaring outwardly from corresponding bottom walls 160 and adapted to surround area 28 of a lid 12 as best shown in FIG. 7. Rectangular, laterally extending edge portions 164 integral with each lower margin of a respective side wall 162 of ram heads 156 are disposed to engage the outwardly extending ledge part of each lid 12 serving to interconnect area 28 with the upper margin of skirt portion 32 thereof. It is also to be seen that respective edges 164 are in direct alignment with proximal opposed ledge portions 118 of tray members 110. External ribs 166 on the outer face of each of the ram heads 156 reinforces bottom wall 160 and side walls 162 thereof to prevent warping of edge portions 164 and assuring an even pressure on the parts of container 10 positioned between edge portions 164 and opposed ledge portions 118 during the sealing operation.

Figure 10:
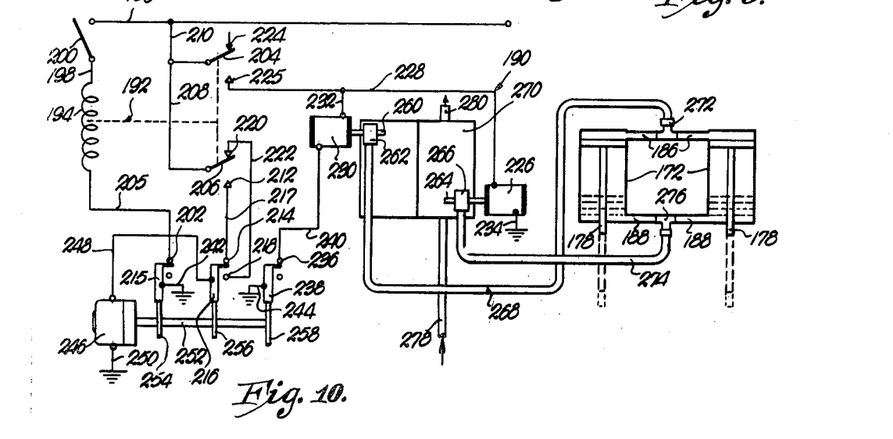
FIG. 10 is a schematic representation of the mechanism forming a part of the sealing apparatus and serving as means for causing the apparatus to automatically perform one cycle of operation upon actuation of the mechanism.

Mechanism broadly designated 168 for reciprocating ram heads 156 toward and away from respective heating elements 48 includes a pair of double-acting piston and cylinder assemblies 170 suspended from the lower face of inner wall 88 rearwardly of cross member 142 and structures 90. Cylinders 172 of each assembly 170 have an extension 174 at the normally uppermost end thereof adapted to be pivotally received within and carried by parallel, horizontally spaced, corresponding ears 176, welded or otherwise secured to the underface of inner wall 88. It can therefore be seen that cylinders 172 depend from inner wall 88, with the piston rods 178 thereof extending downwardly and pivotally connected to corresponding links 180, in turn connected at respective extremities thereof to ears 182 secured to and projecting outwardly from the inner surface of side wall 38 in substantial alignment with corresponding piston rods 178. The ends of links 180 opposed to ears 182 are pivotally joined to connectors 184 secured to and depending from cross member 142, while piston rods 178 are pivotally joined to links 180 intermediate the ends thereof. Fluid lines 186 and 188 communicating with the interior of each of the cylinders 172 at opposed ends thereof permit fluid to be introduced into either end of the cylinders 172 and likewise, permitting exhausting of such fluid at the opposite ends thereof. Automatic control mechanism broadly numerated 190 and schematically illustrated in FIG. 10, is mounted within housing 36 and includes a relay 192 provided with a coil 194 connected to a power line 196 through a lead 198 having a switch 200 interposed therein. The end of coil 194 opposed to lead 198 is coupled with the contact 202 of a cam-operated limit switch 215 by a line 205. The ganged switch poles 204 and 206 of relay 192 are electrically connected through a lead line 208 which is in turn coupled with power line 196 by a lead 210. Contact 212 of relay 192 adapted to be engaged by pole arm 206 is connected to a contact 214 of a cam-operated switch 216 by a lead line 217. The other contact 218 of switch 216 is connected to the contact 220 opposed to contact 212 by line 222. Contact 224 of relay 192 adapted to be engaged by pole arm 204 is open, while the opposed contact 225 is joined to solenoid 226 by line 228 and to solenoid 230 by line 232. Solenoid 226 is grounded by a line 234, while solenoid 230 is electrically coupled with the contact 236 of cam-actuated limit switch 238 by line 240. Limit switches 215 and 238 are grounded by respective lines 242 and 244, while the contacts thereof opposed to corresponding contacts 202 and 236 are open.

Limit switch 216 is operably coupled with a combination timer and motor 246 by lead line 248, and timer and motor 246 is in turn grounded by line 250. The shaft 252 of mechanism 190 operably coupled with the shaft of motor 246, carries cams 254, 256 and 258 disposed to engage respective switches 215, 216 and 238 for shifting the latter between opposed contacts, as is clear from FIG. 10. The armature 260 of solenoid 230 is connected to a valve 262 for opening and closing the latter, while the armature 264 of solenoid 226 likewise controls a valve 266. Valve 262 is interposed in a fluid conduit 268 leading from fluid reservoir 270 to a T 272 which is in turn coupled with fluid lines 186 leading to the upper ends of respective cylinders 172. Valve 266 controls flow of fluid through a line 274 from reservoir 270 to a T 276 connected with lines 188 passing to corresponding lower ends of cylinders 172. Supply line 278 connected to reservoir 270 serves to direct additional fluid into the latter, while fluid exhaust line 280 is provided for permitting fluid to pass outwardly from the defined reservoir.

Figure 1:
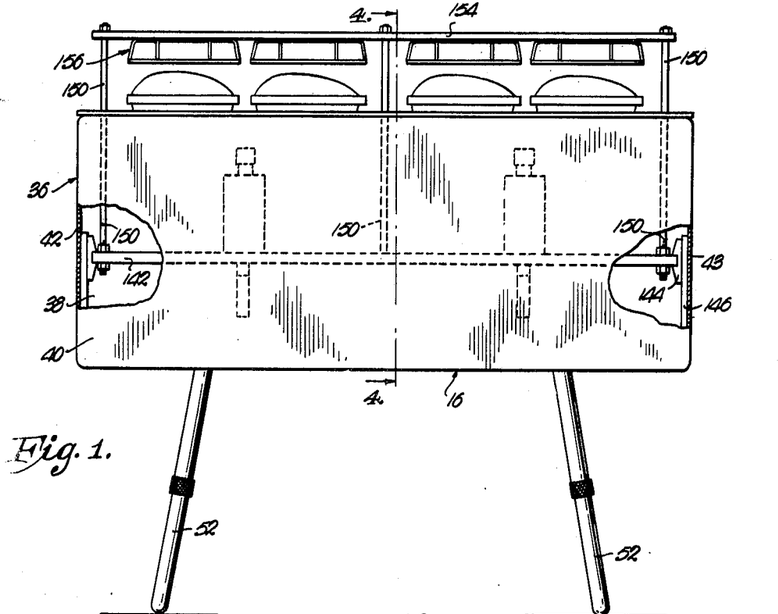
FIGURE 1 is a front elevational view of apparatus for heat-sealing the package container, with portions of the apparatus being broken away to reveal details of guide structure therewithin for vertically reciprocable ram structure.

In operation, it is to be understood that ram heads 156, platens 130 and tray members 110 are maintained at the uppermost ends of their paths of travel, as shown in FIGS. 1, 3 and 5, with coil springs 107 biasing respective sleeves 104 upwardly and cross member 142 engaging the lower extremities of rods 128 also maintaining platens 130 in spaced relationship to tray members 110 and thereby heating elements 48. Switch 200 is also open and combination timer and motor 246 thereby inactivated. During this condition of apparatus 16, valve 262 is open to permit fluid to be exhausted from cylinders 172 through line 268 and via exhaust line 280, while valve 266 is in a condition to permit fluid to be directed through conduit 272 and thereby forcing piston rods 178 toward the uppermost ends of their paths of travel and maintaining cross member 142 in the position illustrated in FIG. 4, by virtue of the pivotal connection of piston rods 178 to respective links 180.

It is further understood that the operator of apparatus 16 has placed products to be packaged, such as a dressed chicken or the like, within a tray 14 and then subsequently a lid 12 is placed over the poultry and tray 14, with skirt portion 32 of lid 12 disposed in overlapping, abutting relationship to flange 24, whereby tray 14 is telescoped within lid 12. The skirt portion 32 of lid 12 serves the additional important function of guiding lid 12 onto tray 14 after a bird has been placed in tray 14 and thus materially increasing the rate at which the poultry products may be packaged by virtue of the fact that the operator is not required to hold the packaging component in alignment prior to insertion of the same into the sealing apparatus.

At least four packages of the character set forth above are prepared and the operator then slides the same into the space between respective ram heads 156 and platens 130 until side walls 20 of trays 14 engage corresponding stops 134. Thereupon, the operator closes switch 200 to energize coil 194 of relay 192, whereby ganged pole arms 204 and 206 are moved into contacting engagement with contacts 225 and 212 respectively. Timer and motor 246 is actuated by virtue of current passing through a circuit traced by power line 196, lead 210, lead line 208, switch arm 206, line 217, contact 214, switch 216, line 248 and motor 246 to ground via line 250.

It should be explained at this point that timer and motor 246 includes gearing for causing shaft 252 to be rotated at a substantially slower speed than the shaft of motor 246, whereby cams 254, 256 and 258 for controlling reciprocation of switches 215, 216 and 238 are likewise turned at a relatively slow speed. At the time of initial actuation of switch 200 to close the circuit to relay 192, cams 254, 256 and 258 are disposed in the positions illustrated in FIG. 10 to thereby maintain switches 215, 216 and 238 in the disposition shown.

Arm 204 of relay 192 is also shifted into engagement with contact 225 whereby solenoid 230 is energized through a circuit traced by power line 196, lead 210, lead line 208, arm 204, contact 225, line 228, line 232, solenoid 230, line 240, contact 236, switch 238 and line 244 to ground. At the same time, solenoid 226 is also energized through line 228 along the circuit traced above and to ground through line 234. Upon actuation of solenoids 230 and 226, valve 262 is opened, while valve 266 is likewise opened to a position whereby fluid is directed into cylinders 172 from reservoir 270 via conduit 268 and supply lines 186. Simultaneously therewith, the fluid within cylinders 172 is exhausted therefrom via lines 188 and line 274 connected to reservoir 270 and which permits exhausted fluid to pass outwardly therefrom through fluid exhaust line 280. When timing motor 246 has rotated cams 254, 256 and 258 for an elapsed period of approximately two seconds, cam 258 permits switch 238 to move to a position engaging the normally open contact opposed to contact 236 whereby the circuit to solenoid 230 is broken and causing valve 262 to be closed as armature 260 is shifted under the action of the spring within solenoid 230. Flow of fluid from reservoir 270 to cylinders 172 via conduit 268 is thereby discontinued.

The components described above are so constructed thaat after the two-second period during which fluid is directed into cylinders 172, piston rods 178 are moved downwardly to cause link 180 to be pivoted about respective ears 182. Swinging movement of the ends of links 180 remote from ears 182 and joined to respective connectors 184 causes cross member 142 to be shifted downwardly with plates 144 sliding between respective guide elements 146. Since rods 128 rest on cross member 142, platens 130 connected to rods 128 move downwardly with the latter and cause containers 10 to be lowered to a preheat position illustrated in FIG. 6.

Skirt portions 32 of lids 12 and flanges 24 of trays 14 are thereby moved into sufficient proximity to heating elements 48 to cause the overlapped, abutting portions of container 10 to be softened without causing substantial shrinkage or melting of the thermoplastic synthetic resin material.

It is also to be noted that as cross member 142 is forced downwardly by piston rods 178 connected to respective links 180, rods 150 are also shifted downwardly to cause ram heads 156 to be moved into engagement with respective lids 12 of containers 10. Edge portions 164 of ram heads 156 engage the outwardly extending portions of lids 12 interconnecting the central areas 28 thereof with skirt portions 32 and the defined outwardly projecting portions of lids 12, as well as the proximal sections of trays 14, are compressed between edges 164 and sections 122 of tray members 110. Thus, during the preheat period, the containers 10 are received within respective tray members 110 and ram heads 156 with the opposed peripheral margins thereof compressing the outer extremities of lids 12 and trays 14.

Cams 254, 256 and 258 are constructed so that when the same have been rotated for an additional period of eleven seconds, cam 258 again closes switch 238 by moving the same into engagement with contact 236 whereby solenoid 230 is energized through the circuit set forth above. Thus, fluid is again directed into cylinders 172 as valve 262 is opened and fluid introduced into the upper ends of cylinders 172 via conduit 268 and supply lines 186.

Piston rods 178 are thereby forced downwardly to the lowermost ends of their paths of travel and ram heads 156, engaging tray members 110 through containers 10 disposed therebetween, force tray members 110 and platens 130 downwardly against the action of coil springs 107 which engage bushings 102 and are disposed to normally bias sleeves 104 toward the uppermost ends of the paths of travel thereof as defined above.

As ram heads 156 force containers 10 downwardly toward respective heating elements 48, skirt portions 32 of lids 12, and flanges 24 of trays 14 are moved into contacting relationship with the sloping inner surfaces of faces 66 of upright segments 60. As previously described, heating elements 48 are maintained at a somewhat higher temperature than the normal melting point of the synthetic resin material ftom which containers 10 are constructed, and therefore, skirt portions 32 and flanges 24 are subjected to such heat and thus, shrink and simultaneously melt with consequent fusing of abutting portions of the remaining areas of skirt portions 32 and flanges 24.

Pressure is maintained on opposed, outwardly extending margins of lids 12 and trays 14 by virtue of ram heads 156 being forced downwardly by piston rods 178 and tray members 110 being biased upwardly under the influence of coil springs 107. Furthermore, since skirt portions 32 and flanges 24 of container 10 are disposed in overlapping relationship, the extent being dependent upon the size of the chicken 34 enclosed within container 10, it can be be seen that a tight seal is produced regardless of the degree of telescoping of trays 14 into corresponding lids 12.

An air and liquid-tight seal is formed between lid 12 and tray 14 even though portions of the bird may be disposed in the areas between overlapping, outwardly projecting, marginal portions of lid 12 and tray 14 respectively. Prior packages, wherein outwardly extending flanges disposed in overlapping relationship were subjected to heat sealing operations, many times leaked because parts of the bird were interposed between the normally overlapped flanges and thus prevented proper fusing of the packaging materials under the influence of heat. Openings were produced which permitted liquids within the package to run outwardly therefrom or air could pass into the package.

The configuration of grooves 74 in elements 48 is of importance to produce the required seal between skirt portions 32 and flanges 24 of container 10, and the defined angularity of the surfaces presenting grooves 74 has been found to be of significance in producing properly sealed joints without subsequent leakage of fluid into the container or liquids out of the same.

During downward movement of ram head 156, the lower edges of flange portion 24 and skirt portion 32 tend to curl inwardly under the influence of the heat from a respective heating element 48 and thus, when ram head 156 reaches the lowermost end of its path of travel, the outer peripheral portions of flange 24 and skirt 32 are clamped between section 122 of sealing tray member 110 and surface 72 of groove 74. Thus, because of the heat shrinkable characteristics of the polystyrene material from which containers 10 are constructed, the major excess material of flange 24 and skirt 32 are caused to shrink and thereby fuse together, but compression of the outer areas of flange 24 and skirt portion 32 between section 122 and surface 72 prevents shrinking of that part of lid 12 and tray 14 extending downwardly from the outwardly projecting, parallel flange segments thereof and also small areas of flange 24 and skirt 32 clamped between section 122 and surface 72. This permits air-tight sealing of each of the containers 10 and prevents shrinkage of respective flange portions 24 and skirt portions 32 thereof to such a degree as would otherwise produce an opening between the components of the container. Upon upward movement of the platen 130 relative to tray member 110, the curled, fused bead area of flange 24 and skirt 32 of container 10 is pulled loose from the downwardly extending segment 120 of tray 110 by virtue of the relatively flexible nature of such fused bead while the latter is still in a heated condition.

The sealed, outwardly extending edge of containers 32 formed by fusing of flanges 24 and skirt portions 32 presents a relatively rigid bead circumscribing each container 10 and thereby imparting rigidity to the entire package.

It is to be understood that the exact width of each of the skirt portions 32 and flanges 24 which are caused to be shrunk by the heat sealing operation is dependent upon the size of the bird enclosed within respective containers 10 and the degree of overlapping of the defined skirt portions and flanges.

Furthermore, the configuration of trays 14 and lids 12 with curved corners has been found to be important in the production of a tightly sealed package, since the molten material may readily flow around the corners notwithstanding the tendency of the material to bunch or overlap at the corners. Again, the heat-shrinking characteristics of the synthetic resin eliminates bunching of the material which would leave openings through which air or other fluids or liquids could pass.

The cam motor arrangement controlling opening and closing of switches 215, 216 and 238 is timed so that heads 156 maintain containers 10 in a sealing position, as best shown in FIG. 7, for approximately nineteen seconds. Thereupon, cams 254 and 156 have been rotated a sufficient distance to permit both of the switches 215 and 216 to be shifted into engagement with the lower proximal contacts, viewing FIG. 10, whereby the circuit to coil 194 of relay 192 is broken and simultaneously therewith, switch 216 is shifted into engagement with contact 218. Thus, even though ganged arms 204 and 206 are permitted to shift to their initial positions, it can be seen that timing motor 246 continues to operate by virtue of current passing to the same from power line 196 via lead 210, lead line 208, arm 206, contact 220, line 222, contact 218, switch 216 and line 248.

This action permits air to be exhausted from cylinders 172 by virtue of the fact that valve 262 is in a position permitting fluid to be exhausted through conduit 268, while solenoid controlled valve 266 is opened to a location whereupon compressed fluid may pass into the lower end of cylinders 172 via line 274 and lines 188, whereby piston rods 178 are shifted toward the uppermost ends of their paths of travel.

During upward movement of piston rods 178, links 180 are again swung toward their original positions about ears 182 and thus causing cross member 142 to again be shifted upwardly. As cross member 142 is raised, ram heads 156 are shifted upwardly by virtue of rods 150 being moved with cross member 142 and at the same time, cross member 142 engages the lower extremities of rods 128 to force platens 130 to their upper positions substantially level with top wall 44, whereby additional containers 10 having products 34 therein may be placed beneath ram heads 156. Also, upon movement of ram heads 156 away from tray members 110, coil springs 107 bias sleeves 104 and thereby tray members 110 to their preheat positions.

Timing motor 246 continues to drive shaft 252 until piston rods 178 have been shifted to the uppermost ends of their paths of travel, whereupon cam 256 has been rotated to a position permitting switch 215 to shift into engagement with contact 218, thereby breaking the circuit to motor 246 and inactivating mechanism 190.

The next cycle of operation will not commence until switch 200 has again been closed by the operator.

An especially important feature of the invention is the disposition of resistance heating units 80 and 72 in the positions best shown in FIG. 11 and at the corners of openings 56, whereby better distribtuion of heat is provided and firm sealing of the corners of containers 10 is effected. It has been found that by raising the temperature of the corners of skirt portions 32 and flanges 24 to a slightly higher point that the rectilinear stretches of such parts of containers 10, a better seal is obtained at the corners and improved flow of the molten material is accomplished.

Having thus described the invention, what is claimed as new and desired to be secured by Letters Patent is:

1. Apparatus for sealing the overlapped, abutting marginal portions of a pair of members of thermoplastic, heat-shrinkable material and adapted to receive an article therebetween to present a package, said apparatus including a frame; a heating element on said frame and substantially conforming to the configuration of said marginal portions of the members; a platen shiftably mounted on the frame, disposed to receive the package in supporting relationship thereto and normally spaced from the heating element, the latter being disposed across the path of travel of said marginal portions when the package is supported on the platen, said platen being movable downwardly from a first location above the heating element to a second location permitting said marginal portions of the members to engage the element; and a ram shiftably mounted on the frame, above said platen and movable downwardly from a position sufficiently spaced from said first location of the platen to permit placement of the package therebetween, to a disposition engaging the package and subsequently shifting the latter and thereby the platen to said second location thereof with the marginal portions of the member engaging the heating element.

2. Apparatus for sealing the overlapped, abutting marginal portions of a pair of members of thermoplastic, heat-shrinkable material and adapted to receive an article therebetween to present a package, said apparatus including a frame; a heating element on said frame and substantially conforming to the configuration of said marginal portions of the members; a platen shiftably mounted on the frame and disposed to receive the package in supporting relationship thereto, said heating element being disposed within the path of travel of said marginal portions when said package is supported on the platen, the latter being movable downwardly from a first location spaced above the element to a second location permitting said marginal portions of the members to engage the heating element; means on said frame connected to the platen for shifting the latter toward said first location thereof and away from the heating element; a ram shiftably mounted on the frame above said platen and movable downwardly from a position sufficiently spaced from said first location of the platen to permit placement of the package therebetween, to a disposition engaging the package and subsequently shifting the latter and thereby the platen to said second location thereof with the marginal portions of the members engaging the heating element; and power operated means operably coupled with the ram for shifting the latter to and from said disposition thereof.

3. Apparatus as set forth in claim 2, wherein said ram is provided with an edge thereon engageable with said marginal portion of a proximal member for biasing the latter toward the opposed marginal portion of the other member to assure a firm bond between said marginal portions of the members during melting and shrinking of the same by said heating element.

4. Apparatus as set forth in claim 2, wherein said heating element is provided with a groove of dimensions to receive a part of said marginal portions of the members, said ram having a flange thereon disposed to press said marginal portions into said groove as the ram is moved from said position of the same to said location thereof.

5. Apparatus for sealing the overlapped, abutting downturned flange and side margin portions of a polygonal tray and lid respectively formed of thermoplastic, heat-shrinkable material and adapted to receive an article therebetween when in telescoped relationship and thereby presenting a package, said apparatus including a frame; a ring-like polygonal heating element on said frame and substantially conforming to the peripheral configuration of said flange and side margin portions of the tray and lid respectively, said element being provided with a groove extending around the same in a position to receive said flange and side margin portions; a platen mounted on the frame for shifting movement through the heating element and adapted to receive the package in supporting relationship thereto, said heating element being disposed within the path of travel of said marginal portions when said package is supported on the platen, the latter being disposed for downward movement from a first location spaced above the element to a second location permitting said flange and side margin portions of the tray and lid respectively to be received in said groove in the heating element; a ram shiftably mounted on the frame and movable downwardly from a position sufficiently spaced from the first location of the platen to permit placement of the package therebetween, to a disposition engaging the package and subsequently shifting the latter and thereby the platen to said second location thereof with the marginal portions of the members engaging the heating element; and power operated means operably coupled with the ram for shifting the latter to and from said disposition thereof.

6. Apparatus as set forth in claim 5, wherein the surface of the heating element defining the innermost section of the groove therein is disposed at an angle relative to the normal disposition of said downturned flange and side margin portions of the tray and lid respectively to thereby improve the flow of the material during shrinkage and melting of the same by said heating element.

7. Apparatus as set forth in claim 5, wherein means for heating said element includes electrical resistance units disposed at the corners of said element.

8. Apparatus for sealing the overlapped, abutting marginal portions of a pair of members of thermoplastic, heat shrinkable material and adapted to receive an article therebetween to present a package, said apparatus including a frame; a heating element on said frame and substantially conforming to the configuration of said marginal portions of the members; a platen shiftably mounted on the frame, disposed to receive the package in supporting relationship thereto and movable from a position spaced from the element to a location permitting said marginal portions of the members to engage the heating element; means on said frame connected to the platen for shifting the latter toward said position thereof and away from the heating element; a ram shiftably mounted on the frame and movable from a position sufficiently spaced from the platen to permit placement of the package therebetween, to a disposition engaging the package and subsequently shifting the latter and thereby the platen to said location thereof with the marginal portions of the members engaging the heating element; a rod secured to the ram and shiftably carried by the frame; and a selectively actuatable, double-acting piston and cylinder assembly engaging said rod for reciprocating the latter to shift said ram, said assembly including a component shiftably mounted on the frame and disposed to engage the rod for reciprocating the latter, the piston of said assembly being connected to said component for moving the same and said platen being provided with rigid means thereon disposed to be engaged by said component for shifting said platen from a preheating point intermediate the ends of the path of travel thereof to said position of the same, said point being in sufficient proximity to said element to cause the marginal portions of the members to be softened without shrinking or melting of the same when the package is maintained at said point for a predetermined interval by the platen and said ram.

9. Apparatus as set forth in claim 8, wherein is provided a cup-shaped tray member having a bottom, reciprocably mounted on the frame and adapted to receive the tray and thereby said platen, and means operably coupled with said tray member and carried by the frame for normally maintaining said tray member in a disposition with said package at said preheating point when the platen moves into engagement with said bottom of the tray member.

10. Apparatus as set forth in claim 9, wherein said means normally maintaining the tray member in said disposition thereof includes a spring interposed between the frame and said tray member.

11. Apparatus as set forth in claim 10, wherein said tray member has an upper flange segment adapted to support said marginal portion of a proximal package member and substantially complemental with the lower peripheral edge of said ram to thereby compress certain areas of said marginal portions of the package members therebetween when the ram is in said location thereof.

12. Apparatus for sealing the overlapped, abutting marginal portions of a pair of members of thermoplastic, heat-shrinkable material and adapted to receive an article therebetween to present a package, said apparatus including a frame; a heating element on said frame and substantially conforming to the configuration of said marginal portions of the members; a platen shiftably mounted on the frame, disposed to receive the package in supporting relationship thereto and normally spaced from the heating element, the latter being disposed across the path of travel of said marginal portions when the package is supported on the platen, said platen being movable to a location permitting said marginal portions of the members to engage the elements; a ram shiftably mounted on the frame and movable from a position sufficiently spaced from the normal position of the platen to permit placement of the package therebetween, to a disposition engaging the package and subsequently shifting the latter and thereby the platen to said location thereof with the marginal portions of the member engaging the heating element; and means on said frame operably coupled with the ram and said platen for maintaining the package at a preheat position proximal to said heating element prior to movement of the platen and said package to said location with the marginal portions of the same engaging said heating element.

13. Apparatus for sealing the overlapped, abutting marginal portions of a pair of members of thermoplastic, heat-shrinkable material and adapted to receive an article therebetween to present a package, said apparatus including a frame; a heating element on said frame and substantially conforming to the configuration of said marginal portions of the members; a platen shiftably mounted on the frame, and disposed to receive the package in supporting relationship thereto, said heating element being disposed within the path of travel of said marginal portions when said package is supported on the platen, the latter being movable from a position spaced from the element to a location permitting said marginal portions of the members to engage the heating element; means on said frame connected to the platen for shifting the latter toward said position thereof and away from the heating element; a ram shiftably mounted on the frame and movable from a position sufficiently spaced from the platen to permit placement of the package therebetween, to a disposition engaging the package and subsequently shifting the latter and thereby the platen to said location thereof with the marginal portions of the members engaging the heating element; and power operated means operably coupled with the ram for shifting the latter to and from said position and said location thereof, said power operated means including structure for interrupting movement of the ram during shifting thereof in a direction to move said platen into said location thereof at a point with said platen located in a preheating position with said marginal portions of the package in sufficient proximity to said heating element to only soften the same without causing substantial shrinkage or melting of the same.

14. Apparatus as set forth in claim 13, wherein is provided timer means operably coupled with said power means for controlling the period of time said ram maintains the package in said preheating position and subsequently with the marginal portions thereof in engagement with the heating element.

References Cited by the Examiner

UNITED STATES PATENTS

| | | | |
|---|---|---|---|
| 1,978,630 | 10/34 | Hesson | 53—353 |
| 2,712,717 | 7/55 | Keller | 53—30 |
| 2,732,116 | 1/56 | Merrill | 53—42 |
| 3,060,652 | 10/62 | Eckman | 53—42 X |

FRANK E. BAILEY, *Primary Examiner.*

TRAVIS S. McGEHEE, *Examiner.*